United States Patent
Layne

(10) Patent No.: US 6,874,617 B1
(45) Date of Patent: Apr. 5, 2005

(54) MODULAR LINK CONVEYOR CHAIN WITH ROTATABLE ARTICLE ENGAGING ASSEMBLIES

(75) Inventor: James L. Layne, Bowling Green, KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 10/672,250

(22) Filed: Sep. 26, 2003

(51) Int. Cl.$^7$ .............................................. B65G 17/24
(52) U.S. Cl. ..................................... 198/779; 198/853
(58) Field of Search ................................ 198/850, 851, 198/852, 853, 779

(56) References Cited

U.S. PATENT DOCUMENTS

| | | |
|---|---|---|
| 992,176 A | 5/1911 | Erickson |
| 1,123,851 A | 1/1915 | Cooper |
| 1,327,925 A | 1/1920 | Schneider |
| 3,363,735 A | 1/1968 | Hotchkiss |
| 3,550,756 A | 12/1970 | Kornylak |
| 3,679,043 A | 7/1972 | Becker |
| 3,804,230 A | 4/1974 | Krivec |
| 3,828,917 A | 8/1974 | Oestergren |
| 3,874,491 A | 4/1975 | Faure |
| 3,923,150 A | 12/1975 | Jager |
| 3,934,706 A | 1/1976 | Tice |
| 3,964,588 A | 6/1976 | Kornylak |
| 3,976,177 A | 8/1976 | Brown |
| 4,456,116 A | 6/1984 | Jarman |
| 4,681,211 A | 7/1987 | Lodige et al. |
| 4,981,203 A | 1/1991 | Kornylak |
| 5,238,099 A | 8/1993 | Schroeder et al. |
| 5,330,045 A | 7/1994 | Hodlewsky |
| 5,367,352 A | 11/1994 | Schulz-Lekies |
| 5,404,984 A | 4/1995 | Hagman |
| 6,029,802 A * | 2/2000 | Musiari et al. ............. 198/779 |
| 6,364,095 B1 * | 4/2002 | Layne et al. ................ 198/853 |
| 6,367,616 B1 * | 4/2002 | Lapeyre et al. ............. 198/779 |
| 2003/0085106 A1 * | 5/2003 | Corley et al. ............... 198/853 |

* cited by examiner

Primary Examiner—James R. Bidwell
(74) Attorney, Agent, or Firm—King & Schickli, PLLC

(57) ABSTRACT

Disclosed is a conveyor chain including modular links interconnected by an elongated transverse connector rotatably supporting article engaging assemblies including rotatably mounted caps. In one embodiment, the caps are provided with a generally spherical outer surface and are mounted for rotation about an axis generally transverse to a longitudinal axis of the connector. This arrangement thus allows for article conveyance with low backline pressure while facilitating the smooth and efficient diversion of an article in a direction generally transverse to the direction of chain movement through engagement with the caps. The chain may be of fixed length, or alternatively may be adapted to undergo side-flexing movement to negotiate curves or bends when driven in an endless path over a support structure forming part of a conveyor system, as well as longitudinal expansion and compression. One or more spacers may laterally offset the article engaging assemblies on alternating connectors forming the chain.

40 Claims, 5 Drawing Sheets

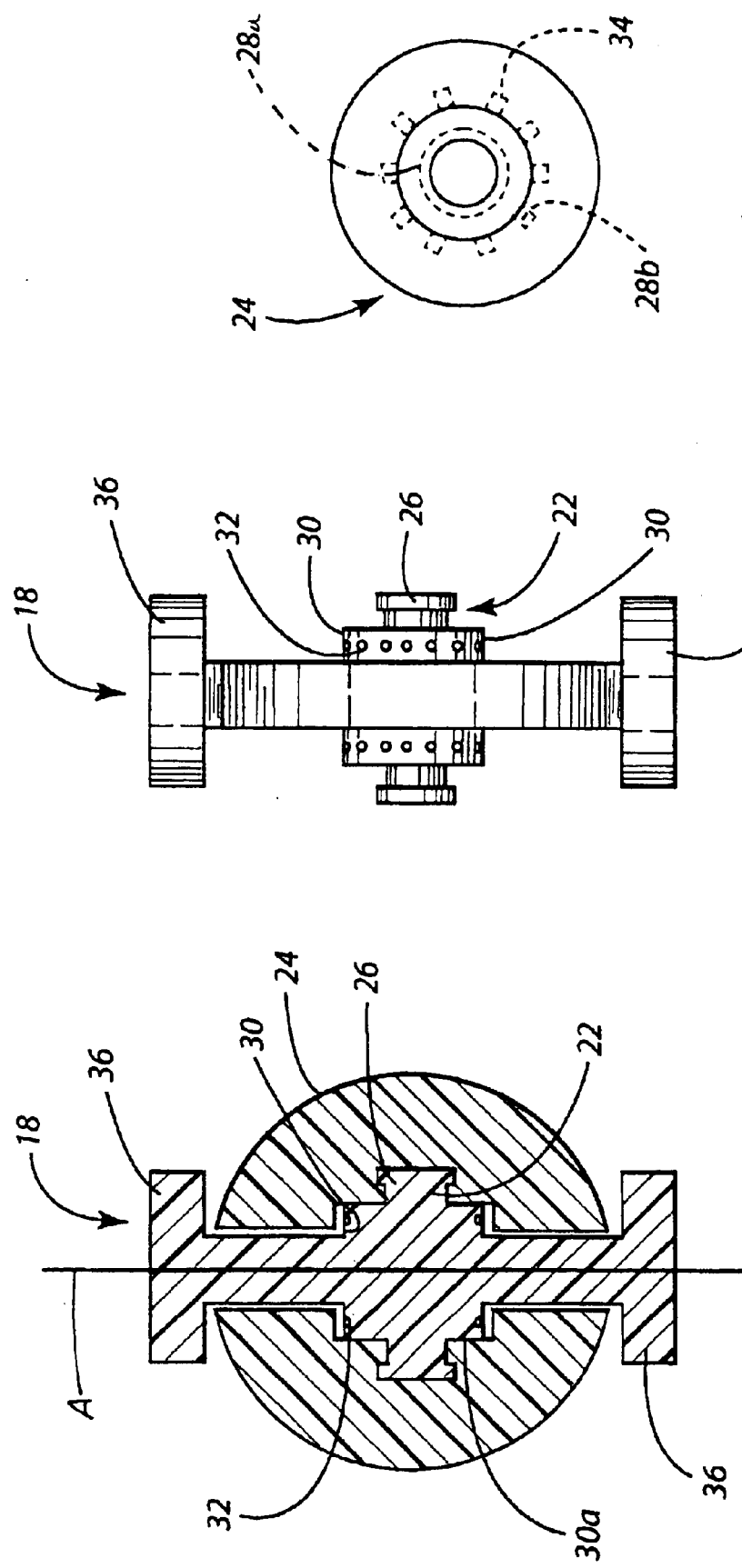

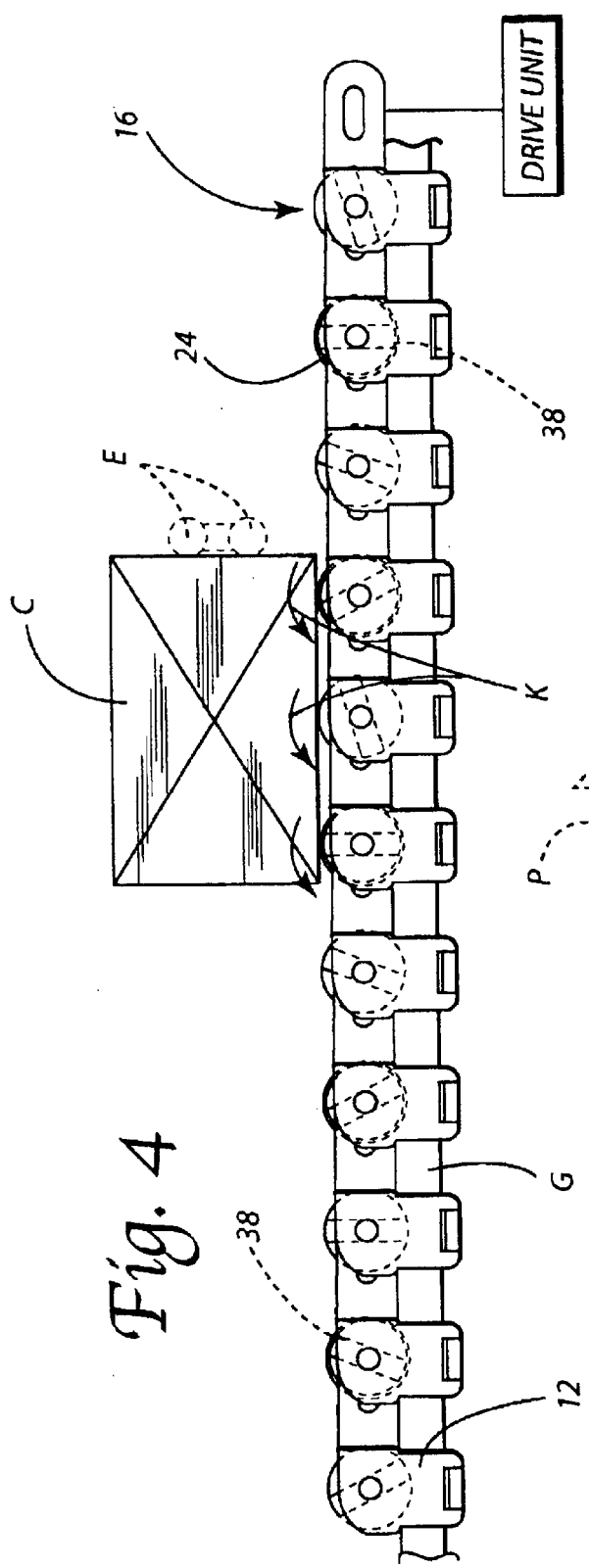
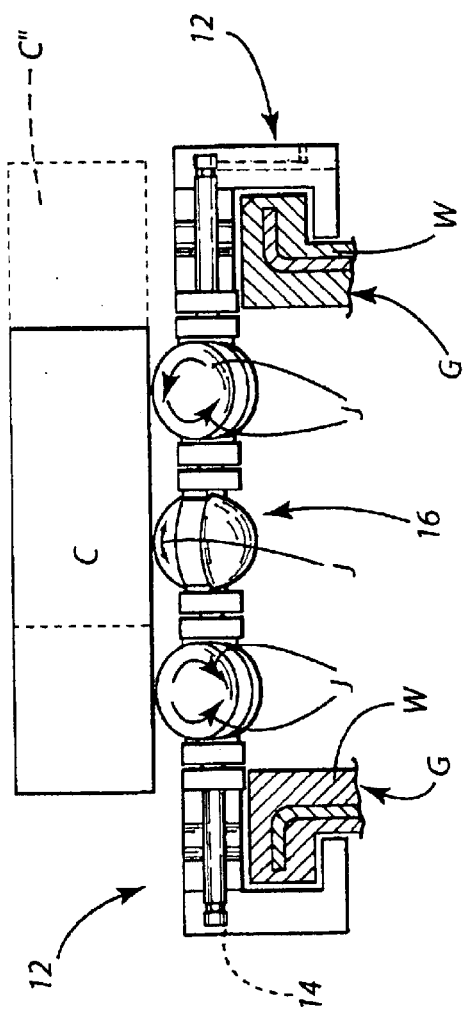

MODULAR LINK CONVEYOR CHAIN WITH ROTATABLE ARTICLE ENGAGING ASSEMBLIES

TECHNICAL FIELD

This invention relates generally to the conveyor art and, more particularly, to a conveyor chain especially adapted for use in situations where moving articles in both a conveying direction and a direction different from the conveying direction may be desirable.

BACKGROUND OF THE INVENTION

The use of modular link conveyors in industry enjoys increasing popularity. Particularly for conveying food articles or consumer products, especially in packages or in semi-packaged form, the modular link conveyor represents the overwhelming choice of those in the industry looking for a long-lasting, low cost conveying solution. In the recent past, significant advances in the development of such have been made so as to provide more efficient handling of an even larger variety of food articles, packages and containers, as well as other types of articles and products.

One of the most popular types of modular link conveyor systems on the market today, if not the most popular, is manufactured and sold by the assignee of the present invention under THE DESIGNER SYSTEM and WHISPER-TRAX trademarks, and illustrated and claimed in prior U.S. Pat. No. 4,953,693, Sep. 4, 1990 and U.S. Pat. No. 5,031,757, issued Jul. 16, 1991. Since the time of these early patents in the art, the significant advances have been fast in coming to provide an even more efficient operation and better handling and transporting of articles and products.

One such advance is the provision of rollers on the transverse connectors to allow for low back pressure operation, as shown in U.S. Pat. No. 3,669,241 to Chalich, U.S. Pat. No. 4,231,469 to Arscott, U.S. Pat. No. 5,330,045 to Hodlewsky, and countless others. The manifold past approaches all generally afford the desirable low back pressure necessary to prevent articles from becoming damaged, especially when the conveyor is operated in an accumulation mode. However, no provision is made for the efficient conveyance of articles in a direction different from the conveying direction (e.g., directly transverse to it), as may be necessary when diversion onto a transfer or take-away conveyor is needed. Although forcibly moving light-weight or low-friction articles laterally across the chain is a possible solution, this increases the risk of damage, and really is not an, option when the articles are large or heavy, such as filled cartons, or have high-friction surfaces, such as tires.

In an effort to overcome the limitations inherent in these types of conventional roller chains formed of modular links, others have more recently proposed forming chains of modular links having a plurality of recesses in the conveying surface, each for receiving a correspondingly sized and shaped rotatable element. A current, commercially popular approach is shown in U.S. Pat. No. 6,148,990 to Lapeyre et al., which discloses the use of both barrel-shaped rollers and spherical balls as the rotatable elements mounted in correspondingly-shaped recesses formed in the conveying surface of the links.

Despite the seemingly advanced nature of this approach, limitations still exist. With respect to the links including the recessed rollers, performance remains limited by the fact that the conveying ability is generally unidirectional. The embodiments with spherical balls seemingly provide for omnidirectional conveyance, but the recess creates a deep pocket where debris and dirt can accumulate and bacteria may propagate. This makes the arrangement not well-suited for use in environments where sanitation is the primary concern (such as the conveyance of articles comprising food products).

Another limitation is that the spherical balls are recessed such that only a small amount of the surface is available for engaging the articles, which would otherwise tend to drag on the stationary link forming the vast majority of the conveying surface. Still another limitation is that the spherical balls may pop-out of the recesses under moderate shearing forces unless a separate cover is used. Losing even a single ball not only renders the links ineffective for use as intended, but also adds to the maintenance expense. The solution of providing a partial cover also complicates the overall assembly, adds to the manufacturing cost, and creates a protruding lip on which the articles may become caught during conveyance. Aside from the likelihood of damage, a caught article may also result in a deleterious jam, causing downtime and requiring costly manual intervention to clear. Since the entire surface of the spherical ball is exposed to the conveying surface during rotation, maintaining the proper lubrication in the corresponding recess to ensure smooth, reduced friction rolling contact may also be a limiting problem.

Accordingly, a need is identified for an improved modular link chain for use in conveying articles or objects capable of achieving low backline pressure, such as in an accumulation mode, and also allowing for the easy, efficient, and smooth diversion of articles in a direction besides the conveying direction.

SUMMARY OF THE INVENTION

In accordance with a first aspect of the invention, a chain for intended use in moving one or more articles in at least a conveying direction and also permitting movement in a direction different from the conveying direction is provided. The chain comprises a plurality of modular links forming a conveying surface, at least one article engaging assembly also forming part of the conveying surface and including a body supporting at least one rotatably mounted cap, and a transverse connector connecting the modular links and rotatably supporting the body. As a result of this arrangement, the article engaging assembly may rotate in the conveying direction to provide low backline pressure for the articles and may facilitate article movement in the different direction through engagement with the rotatably mounted cap.

In one embodiment, the article engaging assembly includes first and second rotatably mounted caps, each having a generally spherical outer surface. The body includes first and second generally opposed supports for receiving and supporting the first and second caps. Each support extends in a direction generally transverse to a longitudinal axis of the connector, and each cap includes a recess having a first portion adapted for receiving and holding an oversized portion of the corresponding support to capture the cap thereon. The recess includes a second portion adapted for receiving a generally circular seating protrusion forming part of the support, whereby the seating protrusion may provide a bearing surface for the cap.

The seating protrusion may also include an outer surface having one or more indentations adapted for receiving a lubricant. Alternatively or in addition to the indentation(s), the cap may include at least one relief area adapted for receiving a lubricant. Preferably, the body includes a transverse channel for receiving the connector with sufficient clearance to permit free rotation, including when backline pressure is present.

A plurality of article engaging assemblies may be rotatably supported by the transverse connector. In cases where the plurality of links are arranged in first and second spaced apart rows, with each row of links including a transverse connector, each connector may rotatably support a plurality of article engaging assemblies. Preferably, the first and second rows are spaced in the conveying direction, and spacers are supported by the connector associated with the first row of links such that the corresponding article engaging assemblies are laterally offset from the article engaging assemblies associated with the second row of links. The spacers may comprise rollers that project above a top edge of the modular links to prevent articles from catching on the top edge, including when backline pressure is present.

Each link may include an apex having a slot for receiving the transverse connector passing through an adjacent link. The slot permits side-flexing action to allow the chain to negotiate curves or bends, as well as longitudinal expansion and compression in the conveying direction. The chain may also be used as part of an overall conveyor system including a drive unit for driving the chain in an endless path along a support structure.

In accordance with a second aspect of the invention, a chain for intended use in conveying one or more articles in at least a conveying direction is disclosed. The chain comprises at least two modular links forming a conveying surface and interconnected by a connector having a longitudinal axis oriented generally transverse to the conveying direction. At least one article engaging assembly also forming part of the conveying surface includes a body rotatably mounted on the connector. The body supports at least one cap having a generally spherical outer surface so as to permit rotation about an axis generally transverse to the longitudinal axis.

In one embodiment, the article engaging assembly includes first and second caps, each having a generally spherical outer surface and mounted on first and second mounting posts extending from opposed sides of the body.

Each cap further includes a first portion adapted for receiving an oversized head portion of the corresponding mounting post in snap-fit engagement, as well as a second portion adapted for receiving a seating protrusion forming part of the mounting post. The seating protrusion may include an outer surface having at least one indentation adapted for receiving a lubricant. The body includes a transverse channel having a longitudinal axis generally transverse to the conveying direction and parallel to the longitudinal axis of the connector. Preferably, a plurality of article engaging assemblies are rotatably supported by the transverse connector, and the plurality of links are arranged in spaced apart rows, each including a transverse connector rotatably supporting a plurality of the article engaging assemblies.

In accordance with a third aspect of the invention, a chain is disclosed for intended use in situations where conveying an article in at least a conveying direction and a direction different from the conveying direction is desirable. The chain comprises a plurality of modular links, as well as means for engaging the article. The engaging means is capable of rotating in the conveying direction, including to allow for low backline pressure in an accumulation mode, and also permits article movement in the different direction.

A connector extends generally transverse to the conveying direction for connecting the modular links to form the chain and rotatably supports the article engaging means.

In one embodiment, the means for engaging comprises a body including an elongated channel for receiving the connector so as to permit rotation of the body in the conveying direction. A pair of generally opposed supports each receive and rotatably support a cap having a rounded outer surface for engaging the article during conveyance in the different direction.

In accordance with a fourth aspect of the invention, a chain for intended use in conveying one or more articles in at least a conveying direction is disclosed. The chain comprises a plurality of modular links arranged in spaced apart rows and interconnected by a connector having a longitudinal axis oriented generally transverse to the conveying direction and a plurality of article engaging assemblies mounted on the connector for independent rotation. Each assembly includes a body having a pair of supports, each supporting at least one cap so as to permit independent rotation about an axis generally transverse to the longitudinal axis of the connector.

In one embodiment, the plurality of links include side links for guiding the chain. Each side link may include a depending arm, an inwardly extending transverse tab, and a receiver for receiving a locking element for retaining the connector. Preferably, the rows of links are spaced in the conveying direction. Additionally, spacers may be supported by the connector associated with a first row of links such that the corresponding article engaging assemblies are laterally offset from the article engaging assemblies associated with a second row of links.

In accordance with a fifth aspect of the invention, a chassis for rotatably supporting first and second caps and for intended use with a modular link conveyor chain for moving articles is disclosed. The chassis comprises a body including a channel having a longitudinal axis and first and second generally opposed support shafts extending generally transverse to the longitudinal axis. Each support shaft includes a portion defining a lip for mating with the cap in snap-fit engagement.

In one embodiment, the support shaft is cylindrical and stepped to form a bearing surface adapted for engaging a corresponding surface formed in a second recess in the associated cap. The support shaft further includes at least one indentation formed therein adapted for receiving a lubricant. The body may further include a generally circular seating surface adapted for matching with a corresponding surface of the associated cap, wherein a diameter of the circular seating surface generally matches a dimension of the corresponding surface of the associated cap. Preferably, the portion defining the lip is oversized and comprises the head of the support.

In accordance with a sixth aspect of the invention, a cap for intended use with a chassis rotatably supported by a connector interconnecting spaced apart links in a conveyor chain is disclosed. The cap comprises a body including a generally spherical outer surface and an internal hub. The hub includes a first recessed portion adapted for receiving an elongated support associated with the chassis and a second recessed portion for receiving and holding a portion of the support in snap-fit engagement. In one embodiment, at least one relief area adjacent the hub is adapted for receiving a lubricant. The second recessed portion may be internal or external.

In accordance with a seventh aspect of the invention, a method of moving articles in a conveying direction is disclosed. The method comprises: (1) interconnecting a plurality of modular links forming a first row with a transverse connector having a longitudinal axis to partially form a chain; and (2) rotatably mounting at least one article engaging assembly on the connector, the assembly including at least one cap mounted for rotation about an axis generally transverse to the longitudinal axis. As a result, the conveying may be with low backline pressure, including in an accumulation mode, and the rotatable caps enable smooth and efficient article movement in a direction different from the conveying direction.

The method may further comprise the step of mounting a first plurality of article engaging assemblies on the transverse connector of the first row of links. Additionally, the method may include the steps of mounting a second plurality of article engaging assemblies on a second transverse connector associated with a second row of links and providing spacers on the second transverse connector such that the first plurality of article engaging assemblies are laterally offset from the second plurality of article engaging assemblies. The step of driving the chain in an endless path may also form part of the method of conveying.

BRIEF DESCRIPTION OF THE DRAWINGS

FIG. 3a is an enlarged, fully cross-sectional side view of the completed article engaging assembly with two opposed support shafts carrying rotatable caps;

FIG. 3b is a side elevational view of the body forming part of the article engaging assembly of FIGS. 2b and 3a;

FIG. 3c is an elevational end view of a cap for possible use in the article engaging assembly of FIG. 3b;

FIG. 4 is a side view of the chain of FIG. 1 illustrating the manner in which conveying with low backline pressure is achieved using the chain driven in an endless path along a stationary support structure;

FIG. 5a is a top view of the chain of FIG. 4, illustrating in particular the manner in which articles may accumulate without damage as a result of the low backline pressure, as well as the possible diversion of an article laterally to a transfer, takeaway conveyor, or the like; and FIG. 5b is a partially cutaway end view showing the manner in which the caps may rotate to facilitate the diversion of articles from the chain in a direction different from the conveying direction in which the chain is driven.

DETAILED DESCRIPTION OF THE INVENTION

Figure 1:
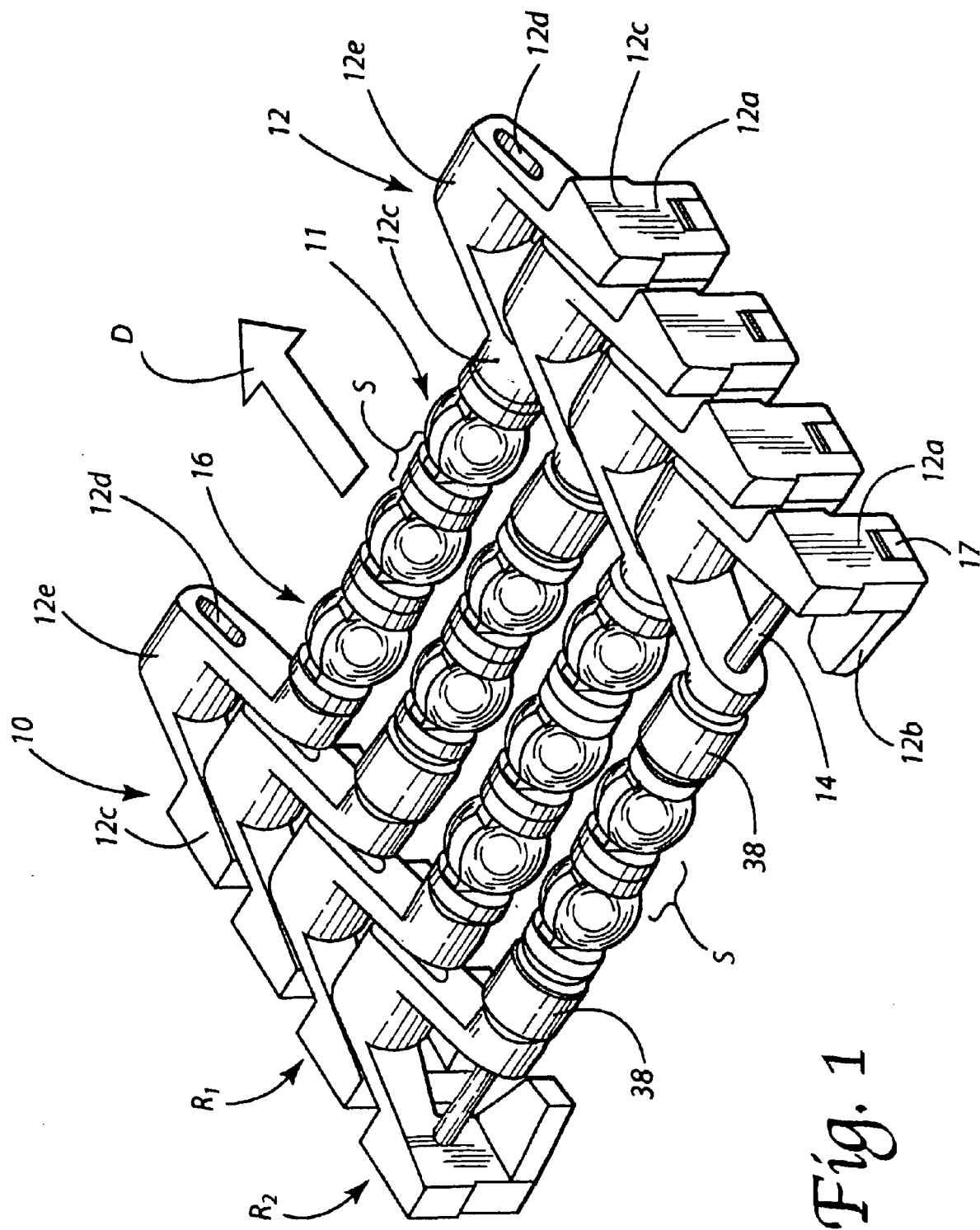
FIG. 1 is an overall perspective view of a chain forming one possible embodiment of the disclosed invention.

Reference is now made to FIG. 1, which depicts an overall arrangement of a conveyor chain 10 constructed in accordance with one embodiment of the present invention and defining a conveying surface 11 for engaging and supporting articles. In this particular embodiment, the chain 10 comprises or includes modular links in the form of side links 12 arranged in spaced apart rows, which thus partially create the conveying surface 11. The rows are interconnected by transverse connectors 14 carrying one or more article engaging assemblies 16. The construction and function of these assemblies 16 is outlined further in the following description.

Figure 2A:
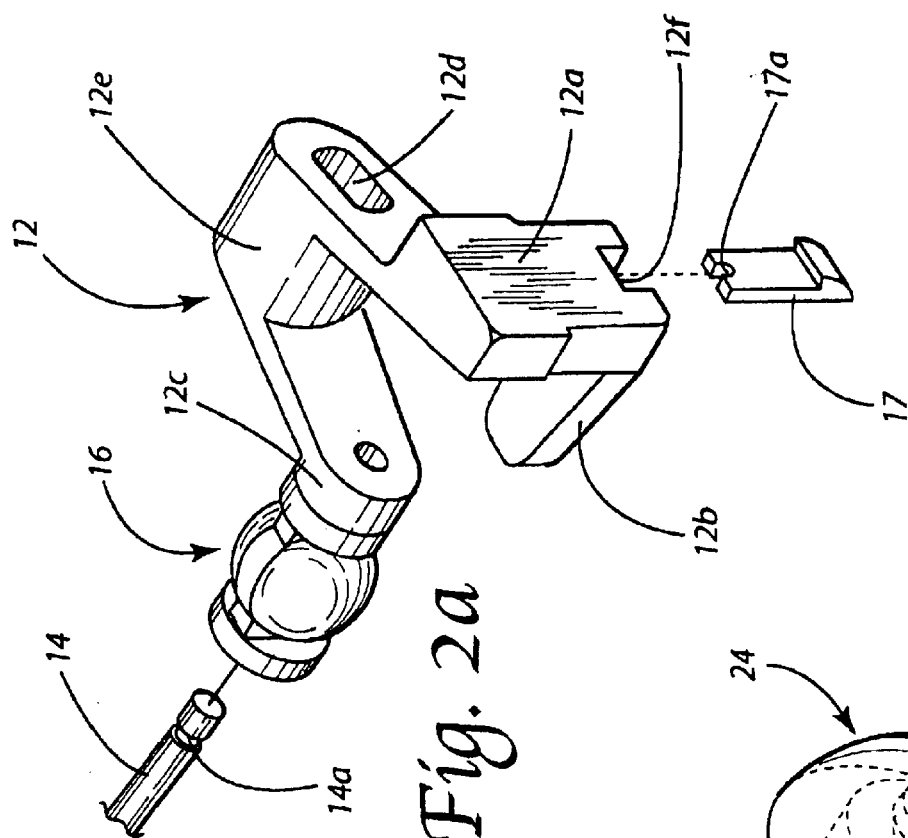
FIG. 2a is a partially cutaway, partially exploded perspective view of a side link combined with a transverse connector and an article engaging assembly.

With regard to the side links 12, and as perhaps best understood with reference to FIG. 2a, each may be identical, or optionally may include an outer depending arm 12a and an inwardly projecting transverse tab 12b (thus creating different right handed or left handed side links, depending on the particular positioning). When present, the depending arm 12a and transverse tab 12b are designed to receive a conventional support structure, which may include a guide rail G (see FIGS. 4 and 5b). Each guide rail G may comprise a wear strip W formed of a tribologically enhanced material to provide reduced friction contact with the links 12. Of course, the support structure formed with guide rails of this type is typically used to guide the chain 10 as it is driven in an endless path (such as by a pair of spaced sprockets adapted for engaging the links along a transition from a forward to a return run, or alternatively at an intermediate position). Links 12 of this sort are typically formed of Nylon 6—6, Acetal, or other inexpensive, lightweight, and durable materials using well-known forming techniques (including possibly co-molding of different materials).

Preferably, pairs of side links 12 form rows and are spaced in the direction in which the chain 10 is typically driven (referred to as the longitudinal direction or the conveying direction (note action arrow D), since it corresponds to the main direction in which articles are conveyed by the chain 10 during normal operation, as opposed to the transverse or lateral direction P; see FIG. 5b). To interconnect the pairs of links 12 forming a first (leading) row $R_1$, the transverse connector 14 takes the form of a stainless steel rod passing through aligned holes (see FIG. 2a) formed in foot portions 12c of each generally V-shaped link (and, as described further below, through the article engaging assembly 16 itself). During construction of the chain 10, the links 12 of a second, adjacent (trailing) row $R_2$ are interdigitated with the first row $R_1$, with the connector 14 passing through a slot 12d elongated in the conveying direction D and formed in the apex 12e of each link. As should be appreciated by those of skill in the art, this specific structural arrangement (which is considered entirely optional) allows for the chain 10 to side-flex to negotiate curves or bends, as well as to compress or expand in the longitudinal direction. If such enhanced functionality is not necessary for a particular application, the slots could simply be replaced with plain holes for receiving the connector 14, which would this result in a non-side flexing, non-longitudinally compressible chain.

To interconnect two rows of longitudinally spaced links 12, the connector 14 is retained in place by a locking element or tab 16 removably inserted in a receiver 12f or slot formed in each side link 12. As shown in FIG. 2a, the tab 17 may include a recess 17a for engaging a necked or recessed portion 14a of the connector 14. This pattern of assembly may be repeated as necessary to form a chain 10 having a particular length in the conveying direction. A full description of this type of chain, or conveyor "belt" as it is sometimes called in the vernacular, is found in the commonly assigned '693 and '757 patents, the disclosures of which are fully incorporated herein by reference.

Figure 2B:
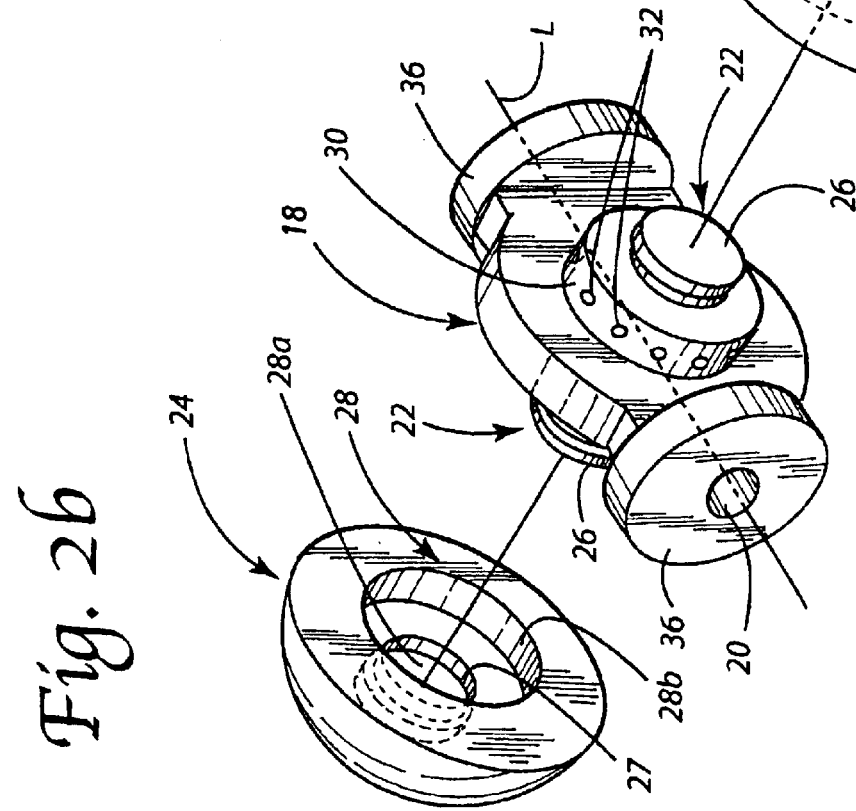
FIG. 2b is an enlarged exploded perspective view of an article engaging assembly including a body for positioning on the connector and a pair of caps, each rotatably mounted on the body and having a generally spherical outer surface.

Turning back to FIG. 1 and with reference also to FIG. 2b, one or more article engaging assemblies 16 are positioned on or over the connector 14 during the assembly of the chain 10. In the illustrated embodiment, as perhaps best shown in FIG. 2b, each assembly 16 includes a body 18 or chassis with an internal channel 20 or bore adapted for receiving the connector 14 extending between and interconnecting the links 12. Preferably, the channel 20 is cylindrical, having a longitudinal axis L extending generally transverse to the conveying direction D and a diameter just slightly larger than the diameter of corresponding connector 14 to create sufficient clearance for rotation. Consequently, each body 18 is free to rotate independently about the connector 14 and in a direction generally corresponding to the conveying direction (see FIG. 4 and note action arrows K) about an axis transverse thereto.

The body 18 further includes at least one and preferably a pair of opposed, generally outwardly projecting supports. The supports may be in the form of generally cylindrical mounting posts or shafts 22 adapted for receiving and rotatably supporting a corresponding cap 24 forming a portion of the article conveying surface. Each shaft 22 may include an oversized portion 26 creating a circumferentially disposed, radially projecting lip for engaging a matching first portion 28a of a cavity or recess 28 in the cap 24 created by a neck 27. The recess 28 forms part of a internal hub for the cap 24 for receiving the support or shaft 22. As perhaps best shown in FIG. 2b, the oversized portion 26 is preferably at the head end of the shaft 22 and is sized to engage the corresponding first internal portion 28a of the recess 28 and remain temporarily held or captured therein upon insertion by way of snap-fit engagement. This allows for the easy installation of the cap 24 on the shaft 22 using manual (finger) pressure and removal in a similar fashion (possibly with the additional use of a simple tool, such as a flathead screwdriver, to overcome any resistance created).

In addition to having an oversized portion, the shaft 22 may also be stepped and include a seating protrusion 30 corresponding to a second portion 28b of the recess 28. As perhaps best shown in FIGS. 3a–3c, this seating protrusion 30 may form a bearing surface 30a for engaging the corresponding or matching surface 24a of the cap 24 adjacent the hub. Whether engagement is present depends on the relative spacing created between these parts (which may vary due to tolerances, which are preferably tight to avoid creating a large space at this interface where debris may enter and accumulate).

In this regard, the portion of the body 18 adjacent the periphery of the cap 24 in the mounted position is also preferably circular in profile, with a diameter matching the corresponding dimension of the cap (see FIG. 1). When the caps 24 are partially spherical, the width of the portion of the body 18 (i.e., the portion sandwiched between the caps) is preferably such that a complete sphere is defined. As should be appreciated, this portion of the body 18 may also help to engage and support the articles being conveyed.

A sidewall of the seating protrusion 30 may also include an outer surface having one or more indentations 32 or dimples. When several are present, these indentations 32 may be circumferentially spaced and are designed to receive a lubricant (e.g., silicone oil) applied externally during the assembly procedure. The lubricant pockets or "wells" thus created help to ensure that the desirable smooth and uninterrupted rotation of the cap 24 is maintained at all times. The indentations 32 also help to retain the lubricant in the interior of the cap 24 where it is needed most, and tend to reduce the frequency with which maintenance is required. In addition or in place of the indentations, the surface of the cap 24 adjacent to the hub may be provided with circumferentially spaced, radially extending relief areas (note phantom depiction of cutouts 34 in FIG. 3c) for performing a similar lubricant retention function.

Each cap 24 in the illustrated embodiment is unitary with a generally spherical outer surface. The caps 24 may each be generally hemispherical in shape (see, e.g., FIG. 3a) but preferably are only partially spherical (i.e., a spherical "cap," which is the region of a sphere lying above or below a given plane; sometimes also called a spherical "segment"). Regardless of the precise form used, the generally spherical, hemispherical, or partially spherical cap 24 unlike a roller or recessed spherical ball includes a large, fully exposed outer surface area for engaging the articles positioned on the chain 10. In contrast to a barrel-shaped roller, the use of a spherical outer surface also tends to minimize the amount of "dead space" on the surface where an article could possibly stall. However, in the normal course of use in conveying relatively large articles, such stalling is unlikely in view of the ability of the assemblies 16 to rotate independently of one another and thus assume a position where engagement with the cap 24 is established (see FIG. 5b). To prevent articles being conveyed from catching on a top edge of the side links 12, the caps 24 are preferably sized to project well above this edge, regardless of the orientation of the body 18 (also see FIG. 5b).

The opposed sides of the body 18 are provided with shoulders 36, which although considered optional are preferred to allow adjacent bodies 18 to engage one another in an abutting relationship and prevent interference among the caps 24 of adjacent assemblies 16. The shoulders 36 may also engage a corresponding face of the side link 12 adjacent the foot portion 12c, as well as any other structures present on the connector 14 (such as a spacer, the function of which is outlined further in the following description). If present, the shoulders 36 may be rounded or circular in profile, and are preferably of a reduced height relative to the apex or center of the cap 24 (which in the spherical cap coincide) and most preferably match with the top edge of the links 12. The resulting assembly (which has a generally I-shaped profile; see FIG. 3b) is considered symmetrical about a plane drawn through the body 18 and generally aligned with the transverse direction (see axis A in FIG. 3a).

When the shoulders 36 are present, it should be appreciated that a small "dead" space S may exist between the caps 24 of adjacent assemblies 16 (see FIG. 1). If the same number of assemblies are associated with adjacent connectors 14, the dead space S thus falls in the same imaginary longitudinal line along the entire chain 10. Although not a concern in situations where the articles have a large, smooth surface for contacting the conveying surface 11 thus formed, smaller articles or those with irregular contact surfaces could under some circumstances experience problems with stalling.

To avoid any potential problems, alternating connectors 14 may be provided with one or more spacers. These spacers, which are shown in the form of rollers 38, advantageously serve to stagger or laterally offset the assemblies 16 on alternating connectors 14 such that the chance of product stalling is significantly reduced or eliminated. When rollers 38 are used, it is preferable to use oversized ones such that the outer surface projects well above the top edge of the corresponding links 12 (e.g., at least 10% of the diameter of the roller; see FIG. 4). This helps to prevent the articles from catching on the links 12, especially during movement in a direction different from the conveying direction (e.g., the transverse direction P).

Figure 5A:
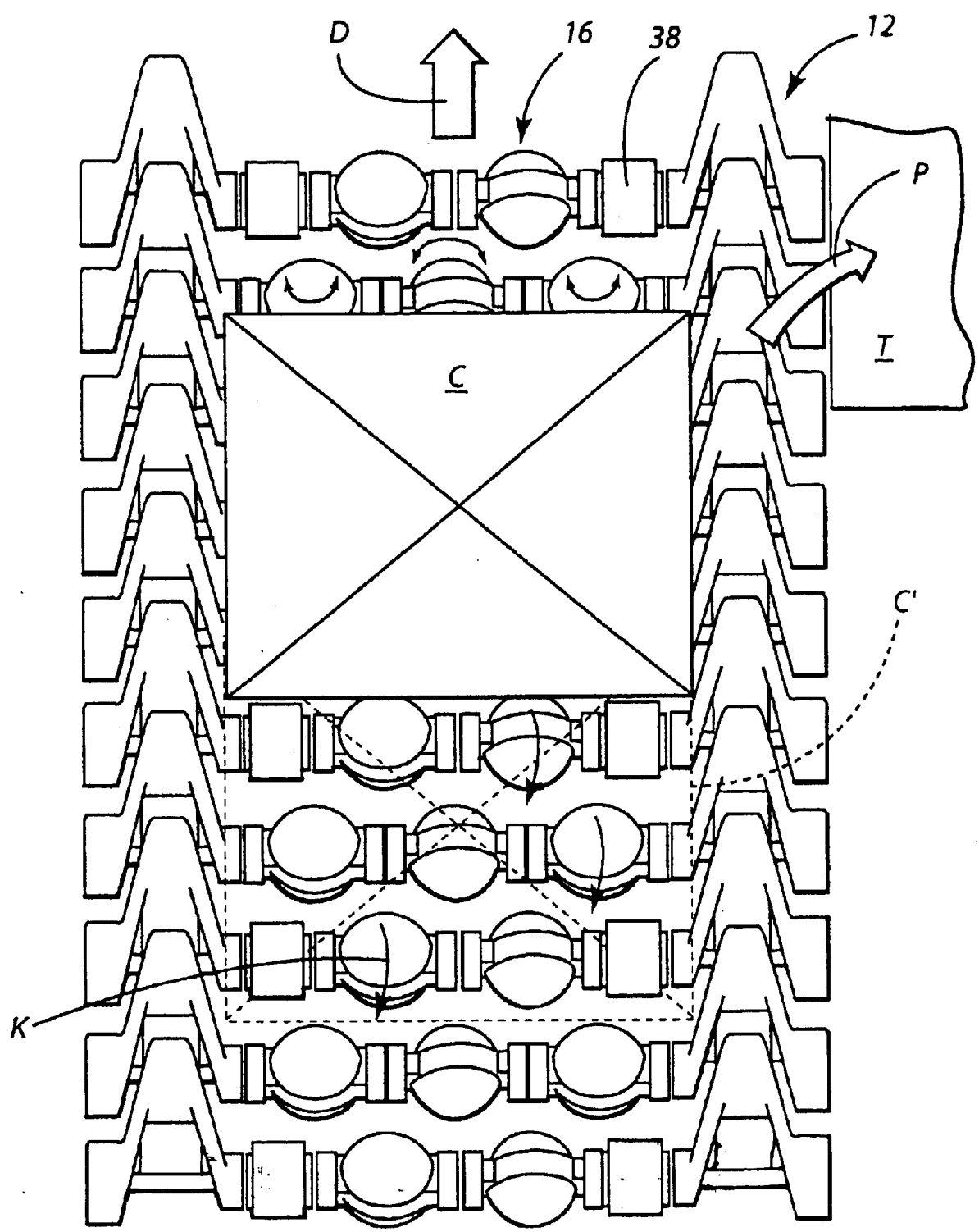

With continued reference now to FIGS. 4, 5a and 5b, the operation of a conveyor system including the chain 10 constructed as described above and mounted on a guide rail G is explained. In the usual mode of operation, the chain 10 is moved along an endless path as described above to convey an article, such as a carton C, from one location to another.

The driving of the chain 10 may be accomplished by sprocket(s) associated with or forming part of a drive unit. The weight of the article typically keeps the assemblies 16 from rotating during conventional operation, which means that the article, or carton C in this instance, travels at the same linear speed as the chain 10 (e.g., 1 ft/s).

If an operation at a downstream location (such as a loading station, transfer, or takeaway point) is such that a backlog of articles or cartons results, or operation in an accumulation mode is desired (which may result from positioning a retractable gate E in the conveying path to create a series of articles; see FIG. 4), the chain 10 with the assemblies 16 mounted for independent rotation on the connectors 14 allows for the desired operation to occur with low backline pressure and/or without damaging a single article being held stationary. Specifically, as the chain 10 is driven in either direction, the assemblies 16 are free to counter-rotate (note action arrows K in FIG. 4, which presumes the chain 10 is being driven forward in the conveying direction D). This helps to prevent the articles, such as cartons C, from becoming damaged by the chain 10 or from damaging (crushing) one another as a result of excessive backline pressure (note full line carton C and abutting carton C' with counter-rotation of assemblies 16 noted).

In a mode of operation where it is desirable to divert one or more of the articles associated with the chain 10 in any direction different from the conveying direction, such as a transverse direction or a partially transverse direction (note action arrow P in FIG. 5a) onto a takeaway conveyor or transfer T, this operation is greatly facilitated through the ability of the caps 24 to freely and independently rotate about the corresponding support shafts 22. Specifically, when an article, such as a carton C, is diverted from the conveying path in either direction using a diverter or like structure, the caps 24 are free to rotate in the corresponding direction (see FIG. 5b and note action arrows J) to facilitate the movement of the article in any direction besides the conveying direction D. The free rotation of the caps 24 (facilitated by internal lubrication) combined with the substantial elimination of dead spots on the conveying surface 11 helps to ensure that the transition laterally across the chain 10 (note phantom depiction of carton C") is achieved in a smooth and efficient manner, without catching and without resultant damage to the article. The ability of each body 18 to rotate independently also helps to ensure that a cap 24 (with its large exposed outer surface) is always in a ready position for engaging the article on the conveying surface 11. Even if this is not the case and momentary catching or engagement with a dead spot occurs, the body 18 (which is typically moving in the conveying direction D during the diversion of the article) immediately tends to rotate such that the desired engagement with the rotatable cap 24 may be established. As should be appreciated, this technique can also be used to align articles on the chain 10 in rows, instead of diverting them onto a separate structure.

Although the embodiment shown in the drawing figures includes only two or three assemblies 16 per connector 14, it should be appreciated that as few as one and more than three could be used. In addition to side links, links could also be positioned between selected assemblies 16, especially when several are present on a single connector (e.g., ten assemblies with a link between numbers five and six). In the case where one or more intermediate links are present, corresponding support structure(s) (such as a guide or support rail, not shown) may be provided (see, e.g., the '693 patent). Likewise, a row of assemblies could be followed by a row of links, or several rows of assemblies could be followed by one or more rows of links.

Additionally, while the use of an internal recess for receiving the oversized portion 26 of the shaft 22 is the preferred arrangement, it is also possible to provide each cap 24 with a channel (not shown) that extends completely through the center or apex of the spherical outer surface. A recessed seating ring may be provided in the outer surface for engaging the lip formed by the oversized portion 26 of the shaft 22 to capture the cap 24 thereon. The downside of this approach is that the exposed portion of the shaft 22 may create an additional dead point on the conveying surface.

The foregoing description of various embodiments of the present invention have been presented for purposes of illustration and description. The description is not intended to be exhaustive or to limit the invention to the precise forms disclosed. Obvious modifications or variations are possible in light of the above teachings. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A chain for intended use in moving one or more articles in at least a conveying direction and also facilitating movement in a direction different from the conveying direction, comprising:

a plurality of modular links;

at least one article engaging assembly including a body supporting at least one rotatably mounted cap; and a transverse connector connecting the modular links and rotatably supporting the body;

whereby the article engaging assembly may rotate to provide low backline pressure for the articles and facilitates article movement in the different direction through engagement with the rotatably mounted cap.

2. The chain of claim 1, wherein the article engaging assembly includes first and second rotatably mounted caps, each with a generally spherical outer surface.

3. The chain of claim 2, wherein the body includes first and second generally opposed supports for receiving and supporting the first and second caps, each support extending in a direction generally transverse to a longitudinal axis of the connector.

4. The chain of claim 3, wherein each cap includes a recess having a first portion adapted for receiving and holding an oversized portion of the corresponding support to capture the cap thereon.

5. The chain of claim 4, wherein the recess includes a second portion adapted for receiving a generally circular seating protrusion forming part of the support, whereby the seating protrusion forms a bearing surface for the cap.

6. The chain of claim 5, wherein the seating protrusion includes an outer surface having one or more indentations adapted for receiving a lubricant.

7. The chain of claim 1, wherein the cap includes at least one relief area adapted for receiving a lubricant.

8. The chain of claim 1, wherein the body includes a transverse channel for receiving the connector with sufficient clearance to permit free rotation, including when backline pressure is present.

9. The chain of claim 1, wherein a plurality of article engaging assemblies are rotatably supported by the transverse connector.

10. The chain of claim 1, wherein the plurality of links are arranged in first and second spaced apart rows, each row of links including a transverse connector rotatably supporting a plurality of article engaging assemblies.

11. The chain of claim 10, wherein the first and second rows are spaced in the conveying direction, and further including spacers supported by the connector associated with the first row of links such that the corresponding article engaging assemblies are laterally offset from the article engaging assemblies associated with the second row of links.

12. The chain of claim 11, wherein the spacers comprise rollers that project above a top edge of the modular links to prevent articles from catching thereon, including when backline pressure is present.

13. The chain of claim 1, wherein each link includes an apex having a slot for receiving the transverse connector passing through an adjacent link, whereby the slot permits side-flexing action to allow the chain to negotiate curves or bends, as well as longitudinal expansion and compression in the conveying direction.

14. A conveyor system including the chain of claim 1 and a drive unit for driving the chain in an endless path along a support structure.

15. A chain for intended use in conveying one or more articles in at least a conveying direction, comprising:
   at least two modular links interconnected by a connector having a longitudinal axis oriented generally transverse to the conveying direction; and
   at least one article engaging assembly, the assembly including a body rotatably mounted on the connector and supporting at least one cap having a generally spherical outer surface so as to permit rotation about an axis generally transverse to the longitudinal axis.

16. The chain of claim 15, wherein the article engaging assembly includes first and second caps, each having a generally spherical outer surface and mounted on first and second mounting posts extending from opposed sides of the body.

17. The chain of claim 16, wherein each cap includes a first portion adapted for receiving an oversized head portion of the corresponding mounting post in snap-fit engagement.

18. The chain of claim 17, wherein each cap includes a second portion adapted for receiving a seating protrusion forming part of the mounting post, the seating protrusion including an outer surface having at least one indentation adapted for receiving a lubricant.

19. The chain of claim 15, wherein the body includes a transverse channel having a longitudinal axis generally transverse to the conveying direction and parallel to the longitudinal axis of the connector.

20. The chain of claim 15, wherein a plurality of article engaging assemblies are rotatably supported by the transverse connector.

21. The chain of claim 15, wherein the plurality of links are arranged in spaced apart rows, each row of links including a transverse connector rotatably supporting a plurality of article engaging assemblies.

22. The chain of claim 21, wherein each link includes an apex having a slot for receiving the transverse connector passing through an adjacent link, whereby the slot permits both side-flexing action and longitudinal expansion and compression in the conveying direction.

23. A conveyor system including the chain of claim 15 and a drive unit for driving the chain in an endless path along a support structure.

24. A chain for intended use in situations where conveying an article in at least a conveying direction and a direction different from the conveying direction is desirable, comprising:
   a plurality of modular links;
   means for engaging the article, the engaging means capable of freely rotating in the conveying direction, including to allow for low backline pressure in an accumulation mode, and also facilitating article movement in the different direction; and
   a connector extending generally transverse to the conveying direction for connecting the modular links to form the chain, the connector rotatably supporting the article engaging means.

25. The chain according to claim 24, wherein the means for engaging comprises a body including an elongated channel for receiving the connector so as to permit rotation of the body in the conveying direction and a pair of generally opposed supports, each receiving and rotatably supporting a cap having a rounded outer surface for engaging the article during conveyance in the different direction.

26. A chain for intended use in conveying one or more articles in at least a conveying direction, comprising:
   a plurality of modular links arranged in spaced apart rows and interconnected by a connector having a longitudinal axis oriented generally transverse to the conveying direction;
   a plurality of article engaging assemblies mounted on the connector for independent rotation, each assembly including a body having a pair of supports, each for supporting at least one cap so as to permit independent rotation about an axis generally transverse to the longitudinal axis of the connector.

27. The chain according to claim 25, wherein the plurality of links include side links for guiding the chain, each side link including a depending arm, an inwardly extending transverse tab, and a receiver for receiving a locking element for retaining the connector.

28. The chain according to claim 25, wherein the rows are spaced in the conveying direction.

29. The chain according to claim 25, further including spacers supported by the connector associated with a first row of links such that the corresponding article engaging assemblies are laterally offset from the article engaging assemblies associated with a second row of links.

30. A chassis for rotatably supporting first and second caps and for intended use with a modular link conveyor chain for moving articles, comprising:
   a body including a channel having a longitudinal axis and first and second generally opposed support shafts extending generally transverse to the longitudinal axis, each support shaft having a portion defining a lip for mating with the cap in snap-fit engagement.

31. The chassis according to claim 30, wherein the support shaft is cylindrical and stepped to form a bearing surface adapted for engaging with a corresponding surface formed in a second recess in the associated cap, the support shaft further including at least one indentation formed therein adapted for receiving a lubricant.

32. The chassis according to claim 30, wherein the body includes a generally circular seating surface adapted for matching with a corresponding surface of the associated cap, wherein a diameter of the circular seating surface generally matches a dimension of the corresponding surface of the associated cap.

33. The chassis according to claim 30, wherein the lip is created by abn oversized portion of a head of the support.

34. A cap for intended use with a chassis rotatably supported by a connector interconnecting spaced apart links in a conveyor chain, comprising:

a body including a generally continuous spherical outer surface and an internal hub having a first recessed portion adapted for receiving an elongated support associated with the chassis and a second recessed portion for receiving and holding a portion of the support in snap-fit engagement.

35. The cap according to claim 34, further including at least one relief area adjacent the hub adapted for receiving a lubricant.

36. The cap according to claim 34, wherein the second recessed portion is generally circular.

37. A method of moving articles in a conveying direction, comprising:

interconnecting a plurality of modular links forming a first row with a transverse connector having a longitudinal axis to partially form a chain having a conveying surface;

rotatably mounting at least one article engaging assembly on the connector to form part of the conveying surface with the links, the assembly including at least one cap mounted for rotation about an axis generally transverse to the longitudinal axis, whereby the conveying may be with low backline pressure in an accumulation mode and the rotatable cap enables smooth and efficient article movement in a direction different from the conveying direction.

38. The method according to claim 37, further comprising the step of mounting a first plurality of article engaging assemblies on the transverse connector of the first row of links.

39. The method according to claim 37, further comprising the steps of mounting a second plurality of article engaging assemblies on a second transverse connector associated with a second row of links and providing spacers on the second transverse connector such that the first plurality of article engaging assemblies are laterally offset from the second plurality of article engaging assemblies.

40. Te method according to claim 37, further including the step of driving the chain in an endless path.

* * * * *

UNITED STATES PATENT AND TRADEMARK OFFICE
CERTIFICATE OF CORRECTION

PATENT NO. : 6,874,617 B1
APPLICATION NO. : 10/672250
DATED : April 5, 2005
INVENTOR(S) : James L. Layne It is certified that error appears in the above-identified patent and that said Letters Patent is hereby corrected as shown below:

Col. 12 line 34
Claim 27, please replace "claim 25" with -- claim 26 --.

Col. 12 line 39
Claim 28, please replace "claim 25" with -- claim 26 --.

Col. 12 line 41
Claim 29, please replace "claim 25" with -- claim 26 --.

Signed and Sealed this

Twenty-first Day of August, 2007

JON W. DUDAS
*Director of the United States Patent and Trademark Office*